ADJUSTABLE MANIPULATOR

Original Filed Jan. 14, 1963 3 Sheets-Sheet 1

INVENTOR.
Jerome H. Lemelson

ADJUSTABLE MANIPULATOR

Original Filed Jan. 14, 1963 3 Sheets-Sheet 2

INVENTOR.
Jerome H. Lemelson

ADJUSTABLE MANIPULATOR

Original Filed Jan. 14, 1963 3 Sheets-Sheet 3

INVENTOR.
JEROME H. LEMELSON

United States Patent Office

Re. 27,129
Reissued June 1, 1971

27,129

ADJUSTABLE MANIPULATOR

Jerome H. Lemelson, Metuchen, N.J.

Original No. 3,260,375, dated July 12, 1966, Ser. No. 251,411, Jan. 14, 1963. Application for reissue June 9, 1969, Ser. No. 848,757
Int. Cl. B25j *3/00*
U.S. Cl. 214—1 18 Claims

Matter enclosed in heavy brackets [ ] appears in the original patent but forms no part of this reissue specification; matter printed in italics indicates the additions made by reissue.

*ABSTRACT OF THE DISCLOSURE*

*An automatic article manipulation apparatus including a selectively positionable, track-riding carriage having a first column depending therefrom which contains a second column telescoped into such first column for longitudinal vertical movement therein. The second column has a jaw assembly hinged to its lower end for swinging movement in a vertical plane. The apparatus effects a plurality of independent motions to position the jaw assembly in a preselected position. For example: (a) the carriage effects self-actuating, reversible travel on a conveyor track; (b) the first column is horizontally rotatable by self-actuating means on the carriage; (c) the second column is vertically displaceable by self-actuating means within the first column; (d) the jaw assembly is selectively rotatable on the lower end of the second column; (e) the jaw assembly has selectively operative jaws for grasping articles; etc. All such motions may be independent of each other or selectively coact with each other in a preselected manner by the use of pre-positioned limit switches.*

This invention relates to automatic article manipulation apparatus and is a continuation-in-part of my application entitled Automatic Conveying Apparatus, Serial No. 477,-467, which was filed on December 24, 1954, and now abandoned.

This invention is particularly concerned with article manipulation apparatus and tooling which is automatically controllable in a predetermined cycle of operative movements to perform many different functions associated with manufacturing operations which would ordinarily require the labor of one or more human beings. Heretofore, article manipulation apparatus has consisted of specialized, inflexible equipment designed and developed to perform a particular work tool or article manipulation function automatically. Other article manipulation devices have been developed since the filing of my aforementioned parent application, Ser. No. 477,467, now abandoned, and are illustrated in said application which are programmable by means of presettable means or command signals generated from recordings. However, such apparatus is relatively complex and costly since it involves, in addition to variable controls, feedback control elements, motor speed and braking controls and a programming means or positional computer. Accordingly, it is a primary object of this invention to provide a new and improved article or tool manipulating apparatus which is adjustably controllable and is relatively simple in structure.

Another object is to provide a manipulating apparatus of new design having a modular structure which may be easily varied both as to the physical dimensions of the apparatus and its automatic operation.

Another object is to provide a manipulating apparatus for articles or tools capable of automatic recycling movements which may be cyclically varied without resort to a programming device.

Another object is to provide an article manipulation apparatus which is cyclically operative to perform various movements in a given realm by means of a plurality of limit switches and positionably variable means for actuating said limit switches.

Another object is to provide an improved variable control system for article and tool manipulation apparatus which is cyclically operative by means of limit switches and does not require a programming means.

Another object is to provide an improved structure in a manipulator joint including means for electrically controlling the relative movement of components of said joint.

Another object is to provide an improved means for controlling the rotation of a manipulator arm relative to a base or second arm.

With the above and such other objects in view as may hereafter more fully appear, the invention consists of the novel constructions, combinations and arrangements of parts as will be more fully described and illustrated in the accompanying drawings, but it is to be understood that changes, variations and modifications may be resorted to which fall within the scope of the invention as claimed.

Figure 1:
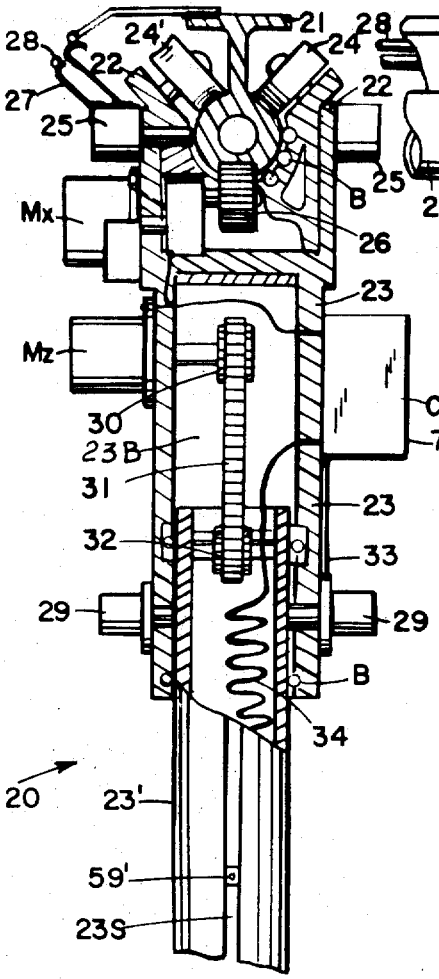
FIG. 1 is a partial view with parts broken away for clarity of a manipulation apparatus suspended from an overhead track.
Figure 2:
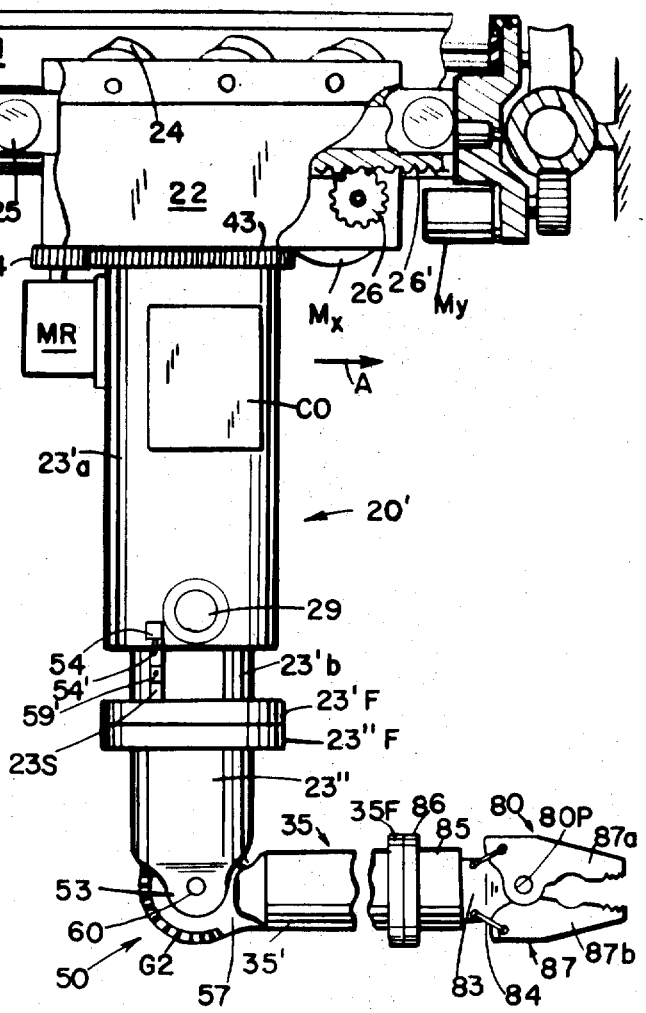
FIG. 2 is a side view of a manipulation apparatus which is a modification of that illustrated in FIG. 1.
Figure 2:
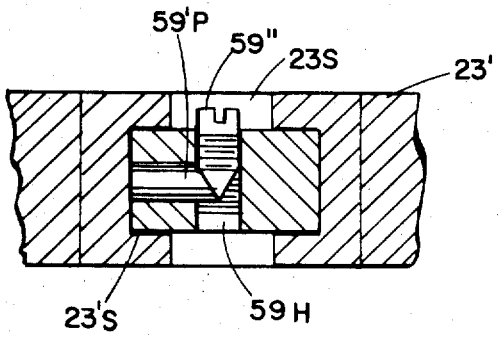
Figure 3:
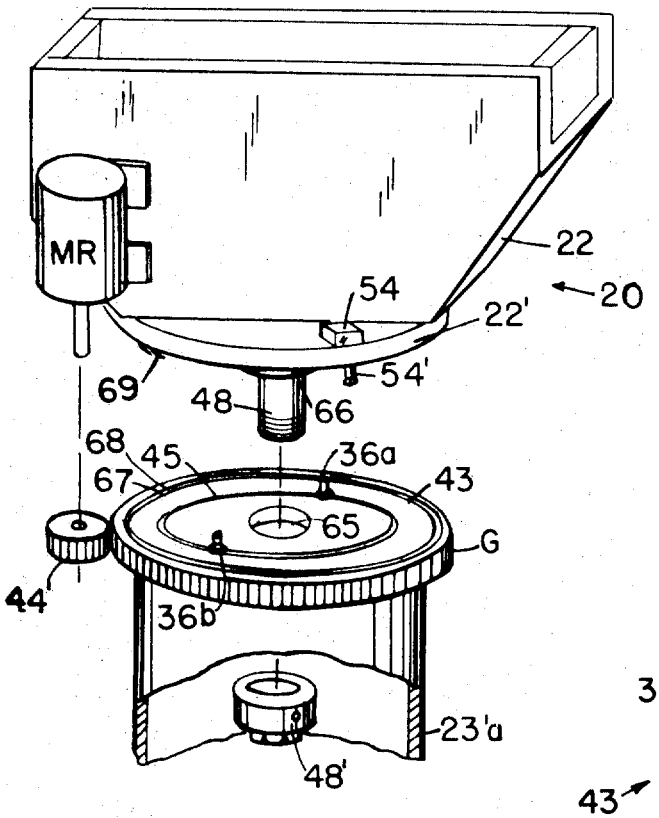
Figure 4:
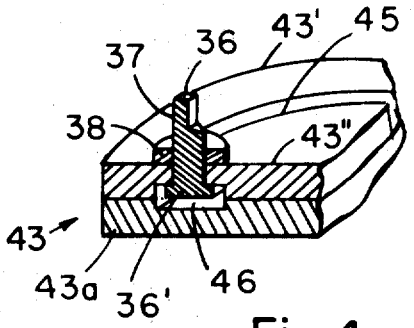
Figure 5:
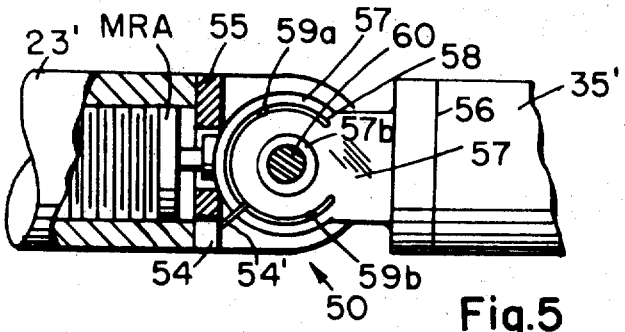
Figure 6:
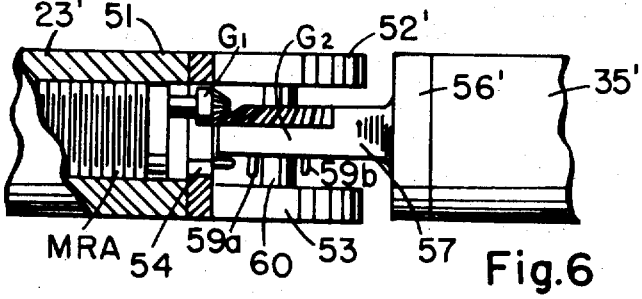

FIG. 2′ is a fragment of a sectional view taken through the manipulator arms of FIG. 1;

FIG. 3 is a partial view of a manipulation apparatus of the type shown in FIG. 2 showing parts broken away and exploded for clarity;

FIG. 4 is a sectioned view showing a fragment of part of the apparatus of FIG. 3;

FIG. 5 is a partially sectioned view of a rotary manipulator joint of the type illustrated in FIG. 2;

FIG. 6 is a partially sectioned view of the joint of FIG. 5; and

Figure 7:
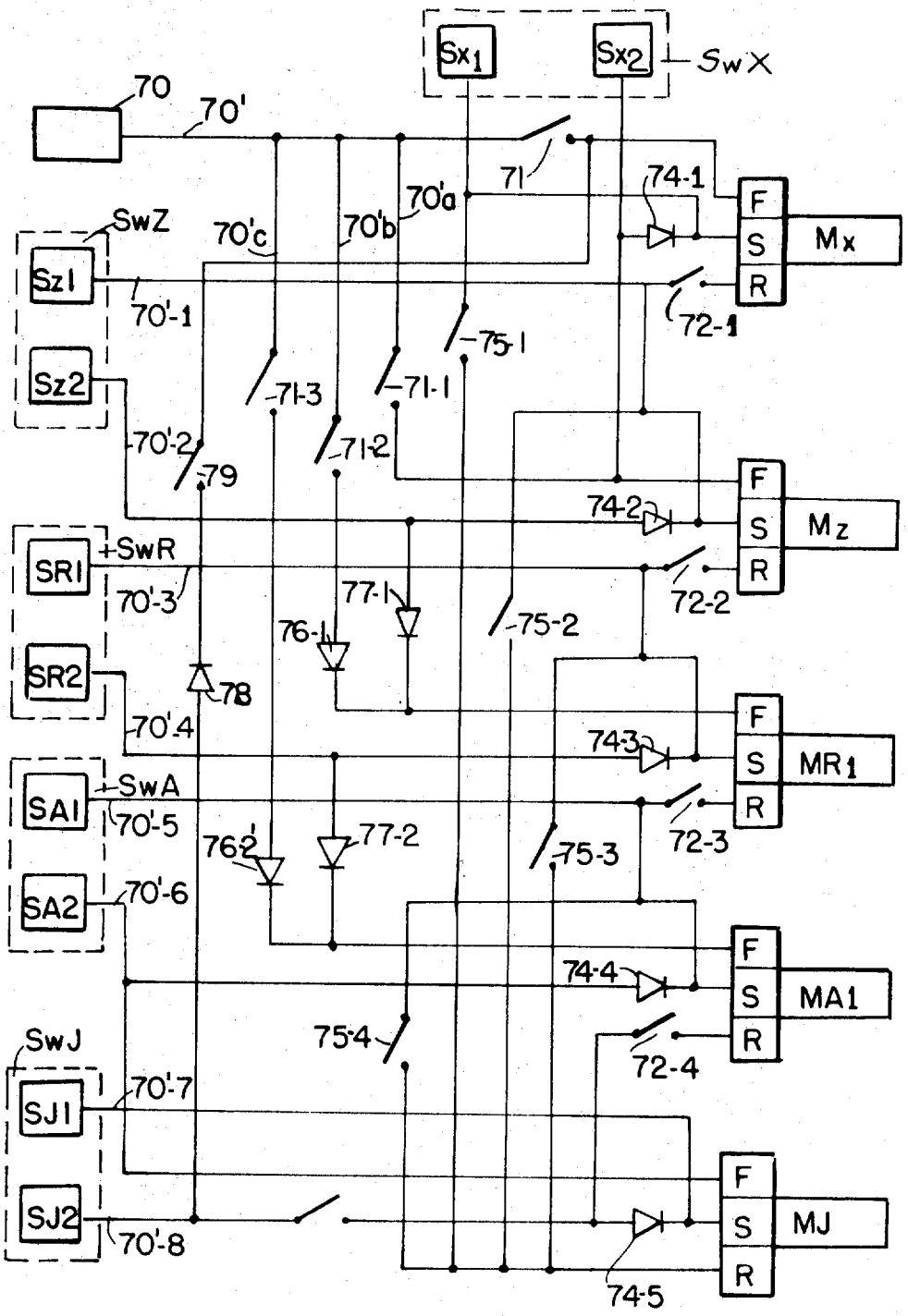

FIG. 7 is a schematic diagram of control means for apparatus of the type illustrated in FIGS. 1–6.

FIGS. 1 and 2 illustrate details of two arrangements of an automatic article manipulation apparatus or tool, certain portions of which form part of this invention and are illustrated in the other drawings. Part of a typical automatic production apparatus 20 is shown in FIG. 1 and application of certain of the features of the apparatus of FIG. 1 to an automatic article manipulator apparatus 20′ is shown in FIG. 2.

The apparatus comprises an overhead support or trackway 21 along which a tool or manipulator may be conveyed by means of a carriage 22 and a plurality of movable linkages or arms. In FIG. 1 a first arm or column 23 is integrally secured to the overhead carriage 22 and supports a plurality of components including a second arm 23′ which is a tubular cylinder adapted for vertical movement through the bore 23B of the column 23. A plurality of wheels 24, 24′ are supported in bearing by formations 22′ defining sidewall portions of the carriage 22 and ride along the lower cylindrical portion 21′ of the overhead track 21 for movement of the carriage assembly therealong. A reversible electrical gear motor Mx is secured to the sidewall of the carriage 22 and has its output shaft driving a toothed wheel 26 which engages a toothed track 26′ cut in the lower surface of the portion 21′ of overhead track 21. Thus by controlling the operation of motor Mx, the position of the carriage 22 and its manipulator or tool assembly may be predetermined along track 21 for performing predetermined operations on work-in-process which is prepositioned or which follows a predetermined path relative to the overhead track. Electrical power for the servo motors associated with the assembly 20 or 20' is derived from overhead wires 28 which are insulatedly supported off the overhead track and are swept by respective electrical brushes or sliding elements 27 which are insulatedly supported off the carriage 22 and extend to respective of the servo motors to be controlled or to a positional computing mechanism CO located in a housing CO' which is shown mounted along the side wall of the column 23. Thus signals transmitted along the overhead wires may be utilized to preset or otherwise control the positional computer CO as well as to suply electrical energy for the operation of said computer and the servo motors to be described. Notation B refers to steel balls mounted within receptacles in the wall of the carriage 22 to provide rolling engagement with the cylindrical portion 21' of the overhead track to simplify the movement of 22 therealong. Notation 25 refers to lineal actuators or servos mounted against the side walls of the overhead carriage 22 which, when activated, are adapted to project their respective actuating arms to engage the wall of the track and to lock the carriage in position.

A reversible gear motor Mz is shown secured to the side wall of column 23 and has a pulley or sprocket wheel 30 secured to its output shaft. A drive belt or chain 31 loops over the sprocket 30 and around a second pulley or sprocket 32 which is supported for rotation within the upper end of the column 23'. The drive chain 31 is thus operative to raise and lower column 23' within column 23 depending on the direction of rotation of the output shaft of motor Mz. Lineal actuators or solenoids 29 mounted on the side wall of 23 are utilized to engage the surface of the column 23' and to lock it in place when 23' is in a predetermined vertical position. Notation 33 refers to the wire connecting the locking actuators 29 with the positional computer CO which controls not only the position in which 23' is stopped and locked but also the degree of operation of the other servos including the locking actuators 25, Mx, Mz and those to be described.

Whereas in FIG. 1 column 23 is fixed relative to the overhead carriage 22, in FIG. 2 the column 23'a is rotationally supported by the overhead carriage. A large spur gear 43 is shown secured to the bottom wall of carriage 22 and the column 23'a is supported on a vertical shaft and bearing (not shown). A reversible gear motor MR is secured to the wall of column 23'a near the upper end thereof and has a small spur gear 44 secured to its output shaft and engaging the teeth of gear 43. Thus as motor MR operates, the column 23'a and the assembly therebelow will rotate in a direction depending on the direction of rotation of the output shaft of MR.

In FIG. 2 a second cylindrical column 23'b is longitudinally movable within the bore of column 23'a and has a flange 23'F secured to the end thereof. A third column 23'' having an upper flange 23''F is secured to the column 23'b by retaining the two flanges together with fasteners. Thus various assemblies, arms and fixtures may be secured to the end of column 23'b depending on the operation to be performed by the apparatus 20'.

The other end of column 23'' is provided with a yoke formation 53, shown in detail in FIGS. 5 and 6, which supports a pin or shaft 60 on which is rotationally supported a gear plate 57 which is secured to a further arm assembly including jaw means 87 at the end thereof for seizing and releasing an article. Notation 50 refers to the entire joint assembly, which will be described and 35 to the manipulator assembly extending outward from said joint assembly. Assembly 35 comprises a first arm 35' of cylindrical tubular shape, a flange 35f at the end thereof, a second arm 85 having a flange 86 and rotationally supported at the end of 35' is secured to a jaw assembly 80 which includes openable and closable jaws 87a and 87b. The jaws 87a and 87b are pivotally mounted on pin 80p supported at the end of a base 83 secured to arm 85 and are operated by respective servos or a single servo through linkages 84 as illustrated in application Ser. No. 477,467, now abandoned.

The apparatus illustrated in FIGS. 1 and 2 is subject to a substantial degree of variation. By providing simple assembly and disassembly means for the joints defined between components 23, 23'; 23'a, 43; 23'', 23b; 35', 23''; 85, 35' and the jaw assembly base 83 and 85, it is easily seen that devices and assemblies of the various configurations may be fabricated by varying the shape, length and configurations of said arms and the type of tool or article seizing means secured to the assembly.

The jaws or other manipulation means defining the end of the manipulator assembly may be replaced with means for retaining an article by gravity such as forks or a platform protruding from one of the illustrated arms. For example, either the jaw members comprising assembly 80 or the assembly defined by the notation 35 in FIG. 2 may be replaced by a platform or a pair of article handling forks and may be manipulated by the means described to be positioned under a pallet, toto box or article and to effect lifting and transporting said article when the other power means are operated in sequence as described hereafter or the platform or forks may be utilized as a transfer means which is automatically positioned to receive articles from a conveyor, chute, machine, etc. and operated cyclically thereafter as described or when a limit switch positioned on said platform (such as relay 70 of FIG. 7) senses the article or is actuated thereby when said article moves onto or is engaged thereby. Magnetic, suction or other forms of article seizing or handling means may also replace the jaws 80 illustrated in FIG. 2 as may a variety of different power operated devices designed to perform an operation or transfer function relative to work-in-process. Reference is made to application Serial Number 477,467, now abandoned for various devices which may be utilized in place of the assembly 80.

As stated, in a preferred mode of operation, the apparatus of FIGS. 1 and 2 may be operated solely by the actuation of a plurality of limit switches and adjustable actuation means associated with the various manipulator arms. In other words, limit switch control means may be utilized not only to effect the controlled movement and prepositioning of the carriage 22 to a predetermined location along the overhead track 21 but also to effect the degree of downward and upward movement of the column 23'a within column 23, the degree of rotation of the column 23 below the carriage 22, the degree of rotation of the first manipulator arm 35' relative to column 23'' in a first direction and its return on the opposite direction, the degree of rotation of the manipulator arm or base 85 relative to the arm 35' in a first direction and its return to a starting or home position and the sequencing and degree of opening and closing of the jaws 87a and 87b of the article seizing means 80 at the end of arm 85.

In FIGS. 1 and 2 adjustable limit defining means is provided for activating a limit switch 54 which is shown secured to the lower portion of the column or arm 23'a and has an actuator arm 54' extending in the direction of the column 23'. The column 23' is shown in FIGS. 1 and 2 as having an elongated channel or slot 23S provided in the side wall thereof and extending along a substantial portion of the length of 23' parallel to its longitudinal axis. Two stops 59', which are operative upon respective upward and downward movement of column 23', to cause actuation of the limit switch actuator arm 54' to activate said switch. Details of the stops and the structure of the walls of the slot 23S are shown in FIG. 2' which is a lateral cross sectional view of the wall of column 23'. Each wall of the slot is indented as illustrated at 23'S' providing respective channels in which the rectangular stop 59' is slidably movable up and down the column 23'. A threaded hole 59H extends through 59' between the major surfaces thereof and a threaded screw 59'' having a conical nose is threaded to engage in said hole. A second hole extends lateral to the axis of hole 59H and contains a pin 59'P one end of which is forced against the inside wall of the channel 23'S when the slotted head fastener 59'' engages the tapered rear face of 59'P, thereby locking the limit switch actuator 59' in a selected position along the longitudinal slot 23S. The arm 54' of the limit switch 54 is preferably rounded or contains a wheel at its end which is positioned to ride against the exposed upward face of the block 59' when column 23' moves upward to close contacts of the limit switch 54 which action is operative to stop the motor Mz and start a second motor such as that located with column 23'' for rotating arm 35' relative thereto.

Limit switch control of the downward movement of column 23' relative to 23 is effected by a second block similar to 59' and located at some predetermined position along the upper portion of the slot 23S but not shown in FIG. 2 as it is situated along a portion of the column 23' which is located within column 23. The actuator arm 54' in riding against the downward side of the actuator block 59', positioned along the upper portion of slot 23S, is deflected and moved thereby to actuate the switch 54 to effect such actions as stopping the motor Mz to preposition the assembly including 23' at a predetermined downward location and starting, for example, the motor located within 23'' for rotating arm 35' in the opposite direction to that in which it was rotated during the prior activation of switch 54.

It is briefly noted that other means, adjustable along either column 23 or 23' may also be applicable for defining the limits of travel of 23'. For example, the means illustrated in FIG. 4 or by other means such as a proximity switch or limit switch operating by means of photoelectrically scanning adjustable indicia or reflective markers replacing the physical stops, may also be applied.

FIG. 3 is a partially exploded view showing details of a rotatable joint assembly such as that defined between components 23'a and carriage 22 or arms 35' and 85. Whereas in FIG. 2 the motor MR is shown secured to the wall of the column 23'a in FIG. 3 said motor is secured to the wall of the carriage 22 and the large gear 43' is secured to the upper end of the column 23'a. Welded to the bottom of wall 22 is a large circular plate 22' approximately equal in diameter to the diameter of gear 43'. Also secured to and extending downward from the carriage assembly 22 is a large threaded axle or pin 48 on which the entire manipulator arm assembly is supported by means of a thrust bearing 48' which is pinned to the end of the shaft 48 after passing through a bore 65 in the center of the gear plate 43'.

Apparatus of the type illustrated in FIGS. 1 and 2 may be automatically controlled to perform a predetermined operation on work-in-process by means of a sequential controller or positional computer which may operate per se to energize and de-energize the forward and reverse controls of the various servo motors utilized to effect movement of one arm member relative to another or in cooperation with the control afforded by one or more limit switches which define the degree of rotation of one component of the joint relative to the other arm or assembly. In FIG. 3, a limit switch 54 is secured to the plate 22' and has an actuator arm 54' extending downward through an opening therein. The switch 54 is a mono-stable switch in which the arm 54' is spring-urged to a center-neutral position until it is urged in either or two directions to close either or two sets of contacts or a single pair of contacts, depending on the control to be effected. In FIG. 3 the degree of rotation of the assembly defined by column 23'a is controlled by respective stops 36a and 36b, each of which is adjustably positionable around a track 45 defined between an outer portion 43' of the gear plate 43 which is secured to the upper end of 23'a and an inner portion or plate 43''. The position of the stops 36a and 36b define respective limits of rotation of the column 23'a since stop 36a will actuate the arm 54' of the limit switch 54 during rotation of the column in a first direction and stop 36b will actuate said limit switch arm during rotation thereof in a second direction. The contacts of limit switch 54 are electrically connected to one or more controls including the control for stopping the motor MR. If the apparatus illustrated in FIG. 1 is controlled by a series of movements of each arm or assembly relative to the others which are defined by making or breaking contacts of limit switches, and the switch 54 comprises two sets of contacts, then each of the contact pairs of said limit switches may be connected not only to the stop control for motor MR but electrically connected for energizing a start control for a respective further servo motor to effect a further mechanical action or movement when the assembly defined by column 23'a has reached a predetermined degree in its rotation.

By making the stops 36a and 36b adjustable to define different limits of travel or rotation of the manipulator assembly relative to the overhead carriage, the assembly and tool or manipulator thereof may be prepositioned at different locations in space for performing many different operations relative to different types of work-in-process or articles. Thus, a complex computer or contour control means will not be necessary for the automatic operation of the apparatus and its performance to meet various product handling requirements.

FIG. 4 illustrates details of means for adjustably positioning and locking the stop-members 36 relative to the circular gear member 43. The gear member 43 is shown as comprising a base plate 43a to which is welded an outer ring 43' and an inner disc 43'' in spaced apart relation leaving a channel 45 therebetween. A circular cavity 46 having portions which extend radially inward and outward of the channel 45 is defined between plates 43a and 43' and 43''. The stop element 36 consists of a threaded shank 37 and a head 36' of enlarged diameter which retains said element against the inside face of the circular opening 46. A nut 38 threads on the shank 37 and locks the element 36 in place when tightened against the outer faces of plates 43' and 43''. Thus by loosening the nut 38, the fastening element 36 may be slidably moved around the channel 45 to a new position depending on the desired limit of rotation of the arm assembly relative to the carriage. It is briefly noted that the assembly illustrated in FIGS. 3 and 4 may be applied to the rotary joint defined between members 35' and 75 of FIG. 2 as well as other rotary joints associated with apparatus similar to that illustrated. Electrical connections across such a rotary joint may be effected by means of one or more circular, flat conducting strips such as 67 and 68 shown in FIG. 3 and insulatedly mounted against the upper face of gear plate 43' which conducting strips are engaged by brush elements 69 which are insulatedly supported in FIG. 3 near the peripheral border of the flat plate 22' and which brushes contact said flat element 67, 68 upon assembly of the joint. The flat elements 67,68 are connected to respective electrical wires which extend to the various controls and power inputs to the servo motors or electrically operated devices secured to the assembly defined by arm 23'a. It is briefly noted that the stop element assemblies 36 may be replaced by other easily adjustable means for actuating the switch 54 upon predetermined degrees of rotation of arm 23'a relative to 22.

FIGS. 5 and 6 illustrate details of a rotary joint such as that defined by the notation 50 in FIG. 2. Whereas the rotary joint of FIGS. 3 and 4 is defined by a rotational axis which is parallel to the longitudinal axes of at least one of the members, the joint 50 is defined by a rotational or pivotal axis which is substantially normal to the longitudinal axes of the arm members 23'' and 35'. Both arm members are illustrated as being substantially cylindrically shaped metal tubes. Secured to the end of arm 23' is a fixture 51 defining yoke members 52 and 53 which yoke members support a pin or axle 60. Secured to the end of the other arm member 35' is a fixture 56 including a disc shaped base 56' which defines a semi-circular bevel gear having gear teeth G2 cut therein around approximately 240 degrees of the circularly shaped end portion of 57. A bore 57' extends through the plate 57 at the radial center of the gear teeth G2 and the pins 60 extend through a ball bearing 57B secured within said bore for permitting rotation of the assembly defined by 35' on the pin or shaft 60.

Removably secured within the end of the tubular arm 23' is a reversible gear motor MRA the output shaft of which is secured to a small bevel gear G1 which engages the teeth of the gear formation G2 in the member 57 for rotating, when operative, said gear and the arm assembly 35' about the axis of the shaft 60. The motor MRA is shown having the outer surface of its housing threaded and is received within a threaded portion of the end of 23' and locked in place by means of pins (not shown). Control of the degree of rotation of 35' relative to 23' is effected by means of limit defining stops 59a and 59b which respectively actuate the arm 54' of the limit switch secured against the end of arm 23' and are operative as described above for stopping the operation of motor MRA as well as otherwise affecting other servo members associated with the apparatus illustrated. The limit pins or stops 59a and 59b are removably and adjustably secured within a channel 58 extending in a circular path around the face of the plate 57 opposite the face containing the bevel gear teeth G2. The structure illustrated in FIG. 4 may be utilized for defining the positions of the switch arm actuating means 59a and 59b each of which may be movable to any position along the slotted track 59b. Other features of the joint illustrated in FIGS. 3 and 4 may also be incorporated in the apparatus illustrated in FIGS. 5 and 6 such as the means for effecting a rotary electrical coupling between the arm members. Also other positionally adjustable means for actuating the limit switch 54 and defining the limit of travel of the arm 35' relative to 23' may also be utilized.

FIG. 7 illustrates an electrical block diagram and includes control components of a typical adjustable manipulator having the electro-mechanical features hereinabove described. Power supplies are not illustrated in FIG. 7 in order to simplify the diagram but it is assumed that the correct source of electrical energy is provided on the correct side of all switches and motor controls. The diagram provided in FIG. 7 is intended to be only illustrative of a possible system employing single motors Mx, Mz, MR1, MA1 and MJ. The latter motor MJ, is representative of that motor or servo which is operative to activate the product handling fixture such as the jaws 87 of FIG. 2 or any other suitable device replacing same for seizing or grasping and releasing an article to be manipulated by the apparatus. Certain of the motors illustrated in FIG. 7 may be eliminated or may be multiplied in number depending on the particular mechanical aspects of the apparatus. For example there may be one or more motors such as MR1 which are operative to rotate a joint assembly about the longitudinal axis of the joint. There may also be one or more motors such as MA1 which are operative to pivot a joint arm such as 35 of FIG. 2 relative to a second arm such as 23''. Accordingly modifications in the switching controls provided in FIG. 7 may be made in accordance with the teachings of this invention to provide sequential switching control as hereinafter described, depending on the particular configuration of the apparatus and the type of sequential action desired.

The notations F, S, and R shown associated with each of the power devices or motors refer respectively to pulse activated controls for said motors which, upon receipt of a control pulse or signal of extended duration from a respective limit switch, will respectively cause the motor to operate in driving the component or assembly coupled thereto in a first direction, stop and reverse. In other words, when the control F is energized upon receipt of a control pulse or signal, the motor will rotate in a first direction; when control S is energized the motor will stop and when control R is energized upon receipt of a pulse, the motor will operate in the reverse direction. Motor Mx is operative to drive the entire manipulator along a guide or track between limits defined by adjustable switch activating means as described such as the movable block 23S of FIG. 2', the adjustably positionable pins 36a and 36b of FIG. 3 or the adjustably positionable pins 59a and 59b of FIGS. 5 and 6.

The blocks referred to by the general notations SW refer to either single limit switches or pairs of limit switches having two switching positions illustrated within the block and referred to by the general notatons S–. For example the switch SWx is secured to the overhead carriage 22 and is a bi-stable switch with a central neutral position to which its actuator arm normally returns when not depressed by a pin or stop secured to the overhead track. In movement along the track from left to right in the direction of the arrow "A," a first set of contacts referred to by the notation Sx2 is closed when the actuator of the switch SWx engages the adjustable stop which defines the rightward limit of travel of carriage 22 or manipulator assembly. Motion in the direction A may be initiated, for example, by pulsing the forward control F of Mx by closing or activating a switch 70 adapted to transmit a pulse thereto. The switch 70 may be closed by an operator or may be operative to scan a conveyor and generate a pulse on its output 70' upon the appearance of an article on the conveyor or upon otherwise identifying the presence of an article within the work area. When switch SWx becomes energized, the contacts or switching output Sx2 generate a control signal or pulse which is transmitted both to the stop control S or Mx and the forward control F and Mz thereby starting the latter motor to cause, for example, the assembly of manipulator elements including column 23' of FIG. 2 to be driven downward relative to 23. Downward movement of said assembly continues until a set of contacts Sz2 of a limit switch SWz (54 of FIG. 2) becomes activated by the uppermost stop or pin located on column 23' such as 23s of FIG. 2'. A pulse is then generated by contacts Sz2 and transmitted to the stop control S of motor Mz and simultaneously to the forward drive control F of motor MR1 causing, for example, rotation of the entire manipulator assembly situated below the overhead carriage 22 of FIG. 2 relative to said carriage. Thereafter, a pin such as 36a of FIG. 3 which has been adjustably positioned relative to a fourth limit switch SWR (54 of FIG. 3) contacts the actuator arm of said limit switch causing electrical contacts SR2 thereof to close and generate a pulse or control signal which is simultaneously transmitted to the stop control S of MR1 and the forward drive control F of motor MA1 (MRA of FIGS. 5 and 6). Motor MA1 thereafter drives the assembly 35 in pivotal action about the joint pivot until an adjustable pin such as 59b of FIGS. 5 and 6 engages and deflects the actuator arm of a limit switch SWA which is illustrated as 54 in FIGS. 5 and 6. Contacts SA2 of SWA are thereby closed and a pulse is generated which is transmitted to the stop control S of MA1 and the closure control F of the motor MJ closing, for example, the jaws 87 of the seizing head 70 against the article which is prepositioned in alignment therewith. Adjustable limit defining stops of the type illustrated in FIGS. 5 and 6 may be provided to control the degree of closure of the clamping head or jaws 87 and may be utilized, for example, to activate or deflect the actuator arm of a limit switch SWJ or the servo opening and closing the jaws or clamp may be operative whereby the limit of closure of the jaw elements is defined by the force developed in compressively engaging the article to be handled. The output of contacts SJ2 of the switch SWJ is also passed simultaneously to the reverse drive control R of motor MA1 causing, for example, the limb assembly 35 to be driven in the reverse direction until the other limit thereof, defined by a second limit pin such as 59a of FIG. 5, is attained, whereupon a second set of contacts SA1 of SWA is closed upon engagement of the actuator thereof against said pin and a control signal is generated on the circuit including SA1 which is passed to both the stop control S of MA1 and the reverse drive control R of motor MR1. A control diode 74–4 is provided in the output of contacts SA2 and the stop control S of motor MA1 between which diode and stop control the output of contacts SA1 is connected so that energization of SA1 will result in pulsing only control S of MA1 and not F of motor MJ.

Operation of rotary joint motor MR1 in reverse eventually results in the closure or activation of the contacts SR1 of switch SWR which simultaneously energizes the stop control S of motor MR1 and the reverse drive control R of motor Mz. A uni-directional gate or diode 74–3 is provided between the output of SR2 and S of MR1. The output of SR1 is connected between the diodes 74–3 and S of MR1 so that the signal generated will not energize F of MA1 to which SR2 is connected directly. Energizing R and Mz causes, in the apparatus of FIG. 2 for example, upward movement of the column 23' and the assembly therebelow relative to the upper column 23 until the contacts Sz1 are closed when the upper stop provided in slot 23s is operative to deflect the actuator of the limit switch SWz (54) effecting closure of contacts Sz1. The output of Sz1 is passed simultaneously to the stop control S of motor Mz resulting in stopping the upward movement of 23' and starting travel of the entire manipulator leftward along the overhead track 21. Movement of the manipulator continues until contacts Sx1 of the limit switch SWx are closed by a pin or stop, defining the leftward limit of travel of the manipulator, deflects or otherwise is effective in closing contacts Sx1 of switch SWx which results in transmission of a control signal to the stop control S of Mx and also to the reverse control R of the motor MJ resulting in opening the jaws of the manipulator to release the article held thereby at a spatial location which is defined by the degree of the hereinabove described movements. The described cycle is repeated when the cycle switch 70 next becomes activated by, for example, sensing the next article as it moves into the field of said device which results in a pulse being transmitted on line 70' to the forward drive control F of motor Mx.

A plurality of other circuits and switches are illustrated in FIG. 7 for rendering the control system and the manipulator apparatus more flexible in operation. For example, in certain article transfer or handling functions, it may be desired to retain the manipulator fixed relative to the guide track along which it is moveable. In other words, it may not be desired to operate motor Mx so that the overhead carriage will not travel along the overhead track during a particular cycle of operation. The article handling or seizing head 80 will still have the ability to engage an article; rotate relative to arm 35'; pivot or rotate through a second arc when 35' is driven about the axis defined by the shaft 60 of the joint 50; move vertically upward and downward as column 23' is driven into and out of column 23 with the operation of motor Mz; and rotate about a vertical axis as the motor MR rotates the entire assembly including column 23 relative to the overhead carriage 22. To effect removal of the motor Mx from the control system of FIG. 7, a first switch 71 in the circuit between cycle start switch 70 and F of motor Mx is opened; and a second switch 71–1 is closed completing a circuit between the contacts of switch 70 and the forward drive control F of motor Mz. Thus, when switch 70 becomes activated, motor Mz will be started to drive the column 23' downward relative to 23 rather than motor Mx and the cycle will include the operation of all motors but the latter. Since the output of contacts Sz1 is connected to R of Mx, a switch 72–1 between Sz1 and R and Mx is opened.

In the event that it is desired to operate all the servos of the manipulator with the exception of motors Mz and Mx, switching means are provided for connecting the cycle start switch 70 directly to the forward drive control F of motor MR1, switches 71 and 71–1 are opened and a further switch 71–2 in the line between 70 and F of MR1 is closed. Since the output of SR1 is connected directly to R of motor Mz, switch 72–2 in said circuit is opened and a switch 71–2, disposed in the circuit between 70 and the forward drive control F of motor MR1 is closed so that, when cycle start switch 70 becomes activated, the motor MR1 will be controlled to operate rather than motor Mz. Simultaneously, a switch 72–2 between the contacts SR1 and R of Mz is opened preventing reverse operation of Mz upon activation of the switch SWR.

If it is desired to operate the manipulator apparatus without rotating the assembly including column 23 relative to the base or overhead carriage 22, switch 71–2 is opened as is a switch 72–3 disposed between 70 and F of MR1 and a switch 71–3 disposed between 70 and F of MA1 is closed connecting the sensing relay or switch 70 directly with the forward drive for motor MA1.

If it is desired to operate the article seizing means or jaws immediately upon a predetermined degree of movement of any of the manipulator components or assemblies as defined by the hereinabove described limit stop means, a plurality of additional circuits and switches are provided in FIG. 7 to effect such control variations. For example, the output of contacts Sz2 is connected directly to the reverse drive R of motor MJ through a switch 75–2 which is closed when a switch 75–1, located in the circuit between contacts Sx1 of switch SWx and R of MJ. If both motors Mx and Mz are deactivated during a cycle, switches 75–1 and 75–2 are opened and a third switch 75–3, located in the circuit between SR1 and R of MJ, is closed thereby resulting in the deactivation or opening of the jaws upon the termination of the cycle as defined by closure of contacts SR1. Finally, if it is desired to close and open the jaws 87 at the limits of a cycle defined solely by the rotation of the assembly including said jaws and arm 35 around the joint J, a fourth switch 75–4, located in a circuit including SA1 and R of MJ, is closed resulting in deactivating or opening said jaws after they have moved in a predetermined arc about the axis of the joint J as defined by the second limit stop such as 59b illustrated in FIG. 5.

It is briefly noted that if it is desired to retain certain of the servo motors operative in a predetermined control cycle while deactivating the controls from others of said motors, switches similar to those provided in FIG. 7 for connecting and disconnecting respective circuits between the contacts of the switches SW and the controls for said motors may be provided and may be selectively opened and closed depending on the particular type of control desired. If said switches are bi-stable solenoid operated electro-mechanical or solid state switching devices, they may be remotely selectively opened and closed by an operator located at a console or switching panel having outputs operatively connected to each switch or by an automatic programming means such as a card or tape reading apparatus. It will then be necessary only to predetermine the limits of travel of one component or assembly relative to the other by prepositioning the limit stop means illustrated for example in FIGS. 2', and 3 to 6.

In a further mode of automatic control, herein proposed, the limit stop means illustrated in FIGS. 2' and 3–6 may be eliminated provided that means are provided for activating the particular limit switch or scanning relay such as 54 with predetermined degrees of lineal movement or rotation of one component or assembly relative to the other. For example, if an electro-mechanical limit switch is utilized to scan and effect control of the motion of one component or assembly relative to the other, its actuator may be deflected with predetermined, equal increments of rotation or lineal motion by riding into and out of indentations defined by equi-spaced holes or serrations in the surface against which it is urged. For example, the track 67 illustrated in FIG. 3 or 58 of FIG. 5 may be replaced by a plurality of equi-spaced holes extending in the same path or by a plurality of shallow projections which are operative to intermittently deflect the actuator of the switch and cause closure and opening of the contacts connected thereto. Each motor may thus be controlled by a predetermining controller such as a presettable counter of the self-resetting type which generates a control pulse upon uncounting in either or both directions which pulse may be transmitted on the circuits 70'–1 to 70'–6 of FIG. 7 to effect the same type of control as described hereinabove. In other words, each of the switches bearing the notations SWz, SWR, SWA, and SWJ may be replaced by presettable predetermining controllers. The block denoted Sz1 may be a self-resetting, presettable counter operative to uncount upon deflection of the actuator arm thereof in a first direction such as when 23' moves downward relative to column 23 and Sz2 may be a similar, self-resetting counter operative to uncount when the actuator arm thereof deflects as 23' moves upward relative to 23. Similarly the other controls SWR, SWA, and SWJ may have respective bi-directional counting mechanisms Sz1, Sz2; SR1, SR2; SA1, SA2; and SJ1, SJ2. The predetermining counters may be preset to reset at a predetermined value and transmit a control pulse by local manual adjustment of each or upon receipt of a predetermined number of control pulses as transmitted from a remote controller, card or tape reading device, computer, etc. Many variations are possible depending on the number of connections and the illustrated switches may be replaced by pluggable connections which when disconnected by unplugging are affected in a similar manner to opening a switch.

Also illustrated in FIG. 7 are diodes 76–1, 76–2, 77–1, 77–2, and 78 located in the respective illustrated circuits which perform the important function of permitting a control pulse to be passed in only one direction on said circuit so that a pulse travelling in the opposite directions from a control relay or limit switch will not energize a servo control situated beyond the diode. Manually operative knife switch 79 is located in a circuit between contacts SJ2 and control F of motor Mx permitting closure of said contacts to be utilized to recycle the apparatus when switch 79 is closed and relay 70 is either automatically inoperative or switch 71 is opened. Thus the cycle may be repeated either by operation of relay 70 or closure of contacts SJ2 of switch SwJ.

In a modified form of the invention, it is noted that the article seizing means of the manipulator such as jaw head 70 may be replaced by, in addition to other types of seizing means, a head having a tool, scanning device or other mechanism associated with assembly, inspection or any intermittently operative work performing function to provide an easily adjustable self-recycling apparatus having a high degree of flexibility as described. For example, the article seizing means 80 illustrated in FIG. 2 may be replaced by a suitable servo operated device operative to inspect or otherwise perform on a workpiece which is prepositioned relative to the apparatus when the article sensing relay 70 of FIG. 7 becomes energized. In such case the motor MJ illustrated in FIG. 7 may be any suitable servo or solenoid operated mechanism operative to activate said tool or head in the sequence provided by the control means illustrated in FIG. 7. An automatic, adjustable apparatus is thus provided which is applicable to many automation functions without the need for complex automatic control apparatus such as recording or numerical control means.

It is to be understood that the above-described arrangements are illustrative of the application of the principles of the invention. Numerous other arrangements may be devised by those skilled in the art without departing from the spirit and scope of the invention.

I claim:

1. A rotatable assembly for use in article manipulators and the like comprising in combination with a first assembly including manipulator elements, a second assembly including a carriage, guide means for guiding said carriage along a predetermined path, first power means for driving said carriage along said predetermined path, rotational coupling means between said second assembly and said first assembly, second power means for rotating said first assembly on said second asembly about a predetermined rotational axis, means for controlling said power means and starting and stopping movement of said carriage along said predetermined path, and rotation of said first assembly between selectively predetermined positions, said control means including first limit switch means and cooperating actuator means, one of which is mounted on said carriage and movable therewith and the other of which is mounted along said predetermined path of carriage travel, such that said first limit switch means is activated upon a selectively predetermined extent of movement of said carriage along said predetermined path, said first limit switch means operatively connected to said first and second power means for stopping the movement of said carriage and permitting the rotational movement of said arm assembly upon the actuation thereof, second limit switch means mounted on one of said assemblies, a plurality of cooperating actuation means mounted on the other assembly in positions to activate said second limit switch means upon rotation of said rotatable assembly to selectively predetermined position relative to each other when said first assembly rotates on said second assembly whereby said first assembly is stopped at selectively predetermined rotational angles relative to said second assembly as defined by said actuator means when activating said second limit switch means.

2. An assembly in accordance with claim 1, said actuation means comprising a plurality of separate switch actuators disposed along a circular path centering at said rotational axis.

3. An assembly in accordance with claim 2, said switch actuation means being positionally adjustable on said other assembly to a plurality of different angular locations whereby said first assembly may be controlled in rotation on to said second assembly to stop in a plurality of different attitudes relative thereto.

4. An assembly in accordance with claim 3, said switch actuation means comprising a plurality of elements which are respectively positionable at different angular locations about said axis of rotation for predetermining the annular location and the degree of movement of said first assembly on said second assembly at the end of each part of a positional cycle.

5. A rotatable assembly for use in article manipulators and the like comprising in combination with a first assembly including manipulator elements, a second assembly including a carriage, guide means for guiding said carriage along a predetermined path, power means for driving said carriage along said predetermined path, rotational coupling means between said second assembly and said first assembly, power means for rotating said first assembly on said second assembly, about a predetermined rotational axis, means for controlling said power means and starting and stopping rotation of said second assembly between selectively predetermined positions, said control means including limit switch means mounted on one of said assemblies, a plurality of cooperating actuator means mounted on the other assembly in positions to activate said limit switch means upon rotation of said rotatable assembly to selectively predetermined positions relative to each other when said first assembly rotates on said second assembly whereby said first assembly is stopped at selectively predetermined rotataional angles relative to said second assembly as defined by said actuator means when activating said limit switch means, said actuator means comprising a plurality of separate switch actuators disposed along a circular path centering at said rotational axis, said switch actuator means being positionally adjustable on said other assembly to a plurality of different angular locations whereby said first assembly may be controlled in rotation on to said second assembly to stop in a plurality of different attitudes relative thereto, said switch actuator means comprising a plurality of elements which are respectively positioned at different angular locations about said axis of rotation for predetermining the annular location and the degree of movement of said first assembly on said second assembly at the end of each part of a positional cycle including a switch actuator plate mounted on said first assembly adjacent said limit switch means, a circular formation in said plate centering at the axis of rotation of said assemblies and means for slidably engaging said plurality of actuator means within said circular formation for radially prepositioning each actuator means on said plate.

6. An assembly in accordance with claim 5, said limit switch means comprising at least one electro-mechanical limit switch mounted on said second assembly offset from the axis of rotation and having an actuator arm disposed to become actuated by each of said actuator means upon rotation of said first assembly relative to said second assembly.

7. An assembly in accordance with claim 6, said actuator means comprising a plurality of actuator pins each provided with means for removably securing it to said switch actuator plate against the circular formation therein.

8. A rotatable assembly for use in article manipulators and the like comprising in combination with a first assembly including manipulator elements, a second assembly including a carriage, guide means for guiding said carriage along a predetermined path, power means for driving said carriage along said predetermined path, rotational coupling means between said second assembly and said first assembly, power means for rotating said first assembly on said second assembly, about a predetermined rotational axis, means for controlling said power means and starting and stopping rotation of said second assembly between selectively predetermined positions, said control means including limit switch means mounted on one of said assemblies, a plurality of cooperating actuator means mounted on the other assembly in positions to activate said limit switch means upon rotation of said rotatable assembly to selectively predetermined positions relative to each other when said first assembly rotates on said second assembly whereby said first assembly is stopped at selectively predetermined rotational angles relative to said second assembly as defined by said actuator means when activating said limit switch means, said limit switch means comprising a bistable limit switch mounted on one of said assemblies and having an actuator arm which is positioned to become actuated by a first of said actuator means upon rotation of said first assembly on said second assembly to a first position to close a first set of contacts, means operatively connected to said limit switch for stopping said first assembly at said first position, control means for causing movement of said first assembly to a further position, actuator means at said further position for operating said actuator arm to close a further set of contacts, and further means operatively connected to said limit switch further set of contacts for stopping said assembly at said further position.

9. A joint for an automatic manipulator comprising in combination with a first joint member, a second joint member pivotally secured to said first joint member for rotation about a predetermined axis, power means secured to said first joint member and operatively coupled to the second joint member for rotating it relative to said first member, means for controlling said power means to operate said joint, means activating said control means to control movement of said second joint member through a selectively predetermined arc from a first position at one selectable limit of said arc to a second position defined at another selectable limit of said arc, said activating means including a limit switch means mounted on one of said joint members offset from the axis of rotation of said joint, said limit switch being operatively connected to said control means for said power means and operative to activate said control means to stop movement of said second joint member upon the activation of said limit switch, a plurality of switch activating means offset from said axis and secured to the other of said joint members for cooperatively engaging said limit switch means, said switch activating means comprising first activating means disposed for activating said switch upon positioning said first and second joint members at said first selectable limit of relative rotation along said arc to stop said second joint member thereat, and second activating means also disposed on said other joint member for activating said switch and stopping said joint members upon relative positioning of said joint members at said second selectable limit of said arc.

10. A manipulator joint in accordance with claim 9, said limit switch having an actuator arm projecting outward from the joint member on which said switch is mounted, said switch actuation means comprising respective index members having respective surfaces adapted to urge movement of said limit switch actuator upon movement of said joint members to respective limits of said arc.

11. A manipulator joint in accordance with claim 9, each of said switch activating means being adjustably positionable at different locations in a circular path adjacent said joint axis whereby the limits of rotation of said second joint member may be changed to vary the degree and said members may be automatically rotated relative to each other and predetermine the rotational coordinates.

12. A manipulator joint in accordance with claim 11, said joint including a shaft defining said rotational axis, said switch activating means comprising a plurality of pins, a plate defining part of said second joint member, said shaft extending through said plate and substantially normal thereto, a circular slotted hole in said plate and concentric with said shaft, and means associated with said pins for removably securing each along any portion of said slotted hole whereby the end of each pin projects into the path of the actuator arm of said limit switch and is operative to move said arm and cause actuation of the switch upon engagement therewith.

13. Article manipulation apparatus comprising in combination with a support, a mechanical arm assembly rotationally mounted on said support, first power means for moving said arm assembly in linear translation and second power means for moving said arm assembly in azimuth rotation with respect to said support, article seizing means mounted on said arm assembly, third power means for said article seizing means adapted to operate said seizing means for retaining and releasing articles, positional control means comprising first, and second limit switch means and cooperating first and second swtich activating means mounted on various parts of said arm assembly, said first limit switch means and its cooperating switch actuating means mounted on parts of said arm assembly which are linearly translated relative to each other by said first power means, such that said first switch actuating means is in the scanning path of said first limit switch means and engages said first limit switch means upon preselectively determinal movement of said linearly translated parts, said second limit switch means and its cooperating switch actuating means mounted on parts of said arm assembly which are azimuth rotated relative to each other by said second power means, such that said second switch actuating means is in the scanning path of said second limit switch means and engages said second limit switch means upon preselectively determined movement of said azimuth rotated parts, at least one of said switch actuating means having at least two positionally adjustable limit defining means in the scanning path of its respective limit switch means for activating said switch when the respective relatively movable parts of said apparatus are at predetermined limits of their travel, each of said first and second limit switch means being operatively connected for activation of its respective power means to drive said arm assembly and said article seizing means between the limits defined by the limit switch actuation and in predetermined coordination wtih said sequence of motions.

14. Article manipulation apparatus comprising in combination with a support, a mechanical arm assembly rotationally mounted on said support, first power means for moving said arm assembly in linear translation and second power means for moving said arm assembly in azimuth rotation with respect to said support, article seizing means mounted on said arm assembly, third power means for said article seizing means adapted to operate said seizing means for retaining and releasing articles, positional control means comprising first, second and third limit switch means and cooperating first, second and third switch activating means mounted on various parts of said arm assembly, said first limit switch means and its cooperating switch actuating means mounted on parts of said arm assembly which are linearly translated relative to each other by said first power means, such that said first switch actuating means is in the scanning path of said first limit switch means and engages said first limit switch means upon preselectively determinal movement of said linearly translated parts, said second limit switch means and its cooperating switch actuating means mounted on parts of said arm assembly which are azimuth rotated relative to each other by said second power means, such that said second switch actuating means is in the scanning path of said second limit switch means and engages said second limit switch means upon preselectively determined movement of said azimuth rotated parts, said third limit switch means and its cooperating switch actuating means mounted on parts of said article seizing means which are relatively movable during operation thereof by said third power means, such that said third switch actuating means is in the scanning path of said third limit switch means and engages said third limit switch means upon preselectively determined movement of said relatively movable parts, at least one of said switch actuating means having at least two positionally adjustable limit defining means in the scanning path of its respective limit switch means for activating said switch when the respective relatively movable parts of said apparatus are at predetermined limits of their travel, each of said first, second and third limit switch means being operatively connected for activation of respective ones of said power means to drive said arm assembly and said article seizing means between the limits defined by the limit switch actuation and to seize and release articles in predetermined coordination with said sequence of motions.

15. Automatic conveying apparatus comprising in combination, a self-propelled conveyor including a first conveying means, a servo means for driving said first conveying means along a first guide means, said first conveying means having a second guide means secured thereto, said second guide means having a first fixture extending therefrom which is adapted for movement in a fixed path relative to a second guide means, a second servo for driving said first fixture along said fixed path, a second fixture extending from said first fixture and movably mounted thereon to be driven along a predetermined path relative to a third guide means, a third servo means for driving said second fixture, adjustable control means for controlling the operation of said apparatus in a repetitive cycle which comprises a plurality of discreet movements of each of the movable parts of said apparatus which movements include the movement of said first conveying means between two positions on said first guide means, the movements of said first fixture between two positions in its fixed path, and the movement of said second fixture between two positions in its predetermined path relative to said first fixture, the means for controlling said apparatus including a plurality of control switching means adapted to become actuated by the movement of a respective part of said apparatus to each of said positions of travel, the means actuating each of said switching means being connected in circuits with the control means for the servo means driving said apparatus in a manner whereby when a moving part of said apparatus reaches a predetermined position in its travel a control switching means will become energized and will operate to cause one of said servo means to stop and to cause another of said servo means to start, the means actuating said control switching means being adjustable in position to permit changes in the degree and end limits of travel of the conveying apparatus controlled thereby whereby the path of movement of said third fixture may be varied to effect a plurality of different conveying requirements each comprising a cycle of motions which may be automatically repeated a plurality of times, before the means actuating said control switching means is changed.

16. Manipulator apparatus including means for seizing and releasing a product, a first arm member retaining said seizing means, a second arm member, said first arm member being rotationally mounted on said second arm member for positioning said seizing means in a plurality of attitudes at different circumferential portions relative to said first arm member, limit switch means mounted on one of said arm members, a plurality of actuation means mounted on the other arm member, first power means operative for rotating one of said arm members relative to the other, and second power means for operating said seizing means, each of said actuator means mounted for movement relative to said limit switch means in a circular path to intersect the actuation means of said limit switch means at predetermined degrees of movement of said arm members relative to each other for defining preselectable travel limits, said limit switch means adapted, when activated by the intersection with said actuator means, for generating a first and second signal, said first signal presenting a stop signal to said first power means for stopping the rotation of said arm members at an arm position defined by a predetermined location of said actuator means, and said second signal presenting a start signal to said second power means for initiating operation of said retaining and seizing means at said predetermined arm position.

17. A manipulator joint in accordance with claim 9, further including a reversible motor secured to said first joint member, first gear means secured to the end of said second joint member adjacent said first joint member, said first gear means comprising a plate having a circular shape, said plate having a circular array of gear teeth provided around at least a part of the periphery of said plate, the radial axis of said gear plate corresponding to said predetermined axis of joint rotation, a drive gear secured to the output shaft of said reversible motor, said drive gear having teeth in operative engagement with the gear teeth of said plate whereby operation of said reversible motor will rotate said plate and said second joint member about said predetermined axis, with the limits of said rotation being defined by the selectable engagement of said limit switch means and said switch activating means.

*18. An article manipulation apparatus comprising: a support, a mechanical arm assembly movably mounted on said support, article seizing means pivotally supported at the end of said arm assembly, first power means for moving said arm assembly in a stroke towards and away from said support along a lineal axis, second power means for rotating said arm member about said lineal axis, third power means for pivoting said article seizing means at the end of said arm assembly, fourth power means for*

*causing said article seizing means to operate in a manner to permit it to seize and release articles, first limit switch means for controlling operation of said first power means, second switch means for controlling operation of said second power means, third switch means for controlling operation of said third power means and fourth switch means for controlling operation of said fourth power means, a plurality of manually adjustable switch activating means which are each variably positionable with respect to respective of said first, second and third switch means and located so as to be movable in proportion to the movement of said arm assembly for activating respective of said switch means for variably controlling movement of said arm assembly to transport said article seizing means to a first location, operate said article seizing means to seize an article, move said article seizing means to a second location after controllably pivoting said article seizing means and translating same along said*

*lineal axis, and to then release said article at said second location.*

References Cited

The following references, cited by the Examiner, are of record in the patented file of this patent or the original patent.

UNITED STATES PATENTS

| | | | |
|---|---|---|---|
| 1,695,359 | 12/1928 | Bath. | |
| 1,837,718 | 12/1931 | Kendall et al. | 212—127 |
| 2,474,945 | 7/1949 | Johnson | 200—47X |
| 2,580,472 | 1/1952 | Smith | 214—147 |
| 2,639,826 | 5/1953 | Welden | 214—147 |
| 2,679,940 | 6/1954 | Goertz et al. | 214—1 |
| 2,822,094 | 2/1958 | Greer | 212—127 |
| 2,861,700 | 11/1958 | James | 214—1 |

ROBERT G. SHERIDAN, Primary Examiner